(12) United States Patent
Jun et al.

(10) Patent No.: US 7,480,409 B2
(45) Date of Patent: Jan. 20, 2009

(54) DEGRADED CHARACTER IMAGE GENERATION METHOD AND APPARATUS

(75) Inventors: Sun Jun, Beijing (CN); Yutaka Katsuyama, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 720 days.

(21) Appl. No.: 11/200,202

(22) Filed: Aug. 10, 2005

(65) Prior Publication Data

US 2006/0056697 A1 Mar. 16, 2006

(30) Foreign Application Priority Data

Aug. 13, 2004 (CN) .................. 2004 1 0058171

(51) Int. Cl.
*G06K 9/34* (2006.01)
*G06K 9/32* (2006.01)
*G06K 9/62* (2006.01)

(52) U.S. Cl. ...................... 382/176; 382/295

(58) Field of Classification Search ............... 382/164, 382/172, 173, 176, 177, 181, 209, 218, 254, 382/260, 272, 276, 277, 289, 294, 295; 707/3, 707/6; 358/3.22, 462, 466

See application file for complete search history.

(56) References Cited

U.S. PATENT DOCUMENTS

| | | | | |
|---|---|---|---|---|
| 5,796,410 A | * | 8/1998 | Baird | 345/471 |
| 5,854,853 A | * | 12/1998 | Wang | 382/176 |
| 6,249,604 B1 | * | 6/2001 | Huttenlocher et al. | 382/174 |
| 6,298,151 B1 | * | 10/2001 | Jodoin et al. | 382/176 |
| 6,453,069 B1 | * | 9/2002 | Matsugu et al. | 382/173 |
| 6,493,463 B1 | * | 12/2002 | Nagarajan et al. | 382/173 |
| 6,671,404 B1 | * | 12/2003 | Kawatani et al. | 382/190 |
| 6,763,146 B2 | * | 7/2004 | Delean | 382/276 |
| 6,778,700 B2 | * | 8/2004 | Karidi et al. | 382/176 |
| 6,782,129 B1 | * | 8/2004 | Li et al. | 382/176 |
| 6,856,697 B2 | * | 2/2005 | Lee et al. | 382/177 |
| 7,079,686 B2 | * | 7/2006 | Ahmed et al. | 382/176 |

* cited by examiner

*Primary Examiner*—Amir Alavi
(74) *Attorney, Agent, or Firm*—Staas & Halsey LLP

(57) ABSTRACT

A method and apparatus for generating a degraded character image at various levels of degradation automatically is presented in this invention. The method comprises rendering the character image on a scene plane; translating and rotating the scene plane according to various parameters; determining a projection region of the character image on an image plane according to various parameters; generating a pixel region mask; and generating a final degraded image by super-sampling. Thus various degraded character images are generated on various conditions of degradation. The generated synthetic characters can be used for performance evaluation and training data augmentation in optical character recognition (OCR).

12 Claims, 5 Drawing Sheets

DEGRADED CHARACTER IMAGE GENERATION METHOD AND APPARATUS

FIELD OF THE INVENTION

The present invention relates to a method and apparatus for generating a degraded character image automatically, more specifically to a degraded image generation method and apparatus based on perspective transformation and super-sampling. The generated degraded character images can be used for performance evaluation and training data augmentation in optical character recognition (OCR).

DESCRIPTION OF RELATED ARTS

With the rapid popularization of digital imaging equipment, video character recognition becomes more and more important. Compared with traditional scanned document, characters in video document usually suffer from great degradation and meet trouble in recognition. An automatic video character image generating method will be very useful for video character recognition. The generated pattern can be used to evaluate how well an OCR engine performs under video degradation. Also, the synthetic video character image can be added to training data to build degraded OCR dictionary, so as to improve the recognition performance of real video characters.

Many papers and patents were published regarding degraded pattern generation, such as:

P. Sarkar, G. Nagy, J. Zhou, and D. Lopresti. Spatial sampling of printed patterns. IEEE PAMI, 20(3): 344-351, 1998

E. H. Barney Smith, X. H. Qiu, Relating statistical image differences and degradation features. LNCS 2423: 1-12, 2002

T. Kanungo, R. M. Haralick, I. Phillips. "Global and Local Document Degradation Models," Proceedings of IAPR 2nd International Conference on Document Analysis and Recognition, Tsukuba, Japan, 1993 pp. 730-734

H. S. Baird, "Generation and use of defective images in image analysis". U.S. Pat. No. 5,796,410.

These methods can generate various types of degraded character patterns. However, Sarkar's method is only effective when the resolution of target image is far less than that of the source image. Kanungo's degradation model lacks a clearly physical background. Baird's invention only focuses on degradation caused by scanning process. None of these methods deals with pattern degradation caused by video imaging.

SUMMARY OF INVENTION

It is an object of the present invention to solve the problems of pattern degradation caused by video imaging.

In one aspect of the invention according to this object, a method for generating a character image at various levels of degradation is provided, which comprises the steps of: rendering a character image on a scene plane; translating and rotating the scene plane according to various parameters; determining a projection region of the character image on an image plane according to various parameters; generating a pixel region mask; and generating a final degraded image by super-sampling.

In another aspect of the present invention, an apparatus for generating a degraded character image at various levels of degradation is provided, which comprises: a character image rendering means for rendering a character image on a scene plane; a scene plane manipulating means for translating and rotating the scene plane according to various parameters; a projection region determining means for determining a projection region of the character image on an image plane according to various parameters; a pixel region mask generating means for generating a pixel region mask; and a degraded image generating means for generating a final degraded image by super-sampling.

Degraded character images can be generated on various conditions of degradation according to the method of the invention.

The accordingly generated character images can be used in degraded image displaying or dictionary making. Dictionary made from degraded character images generated by the invention is very effective for real recognition of defective character.

DESCRIPTION OF THE PREFERRED EMBODIMENTS

Preferred embodiments of the method and apparatus of the invention for generating a degraded character image automatically will be explained below, with reference to the accompanying drawings.

Figure 1:
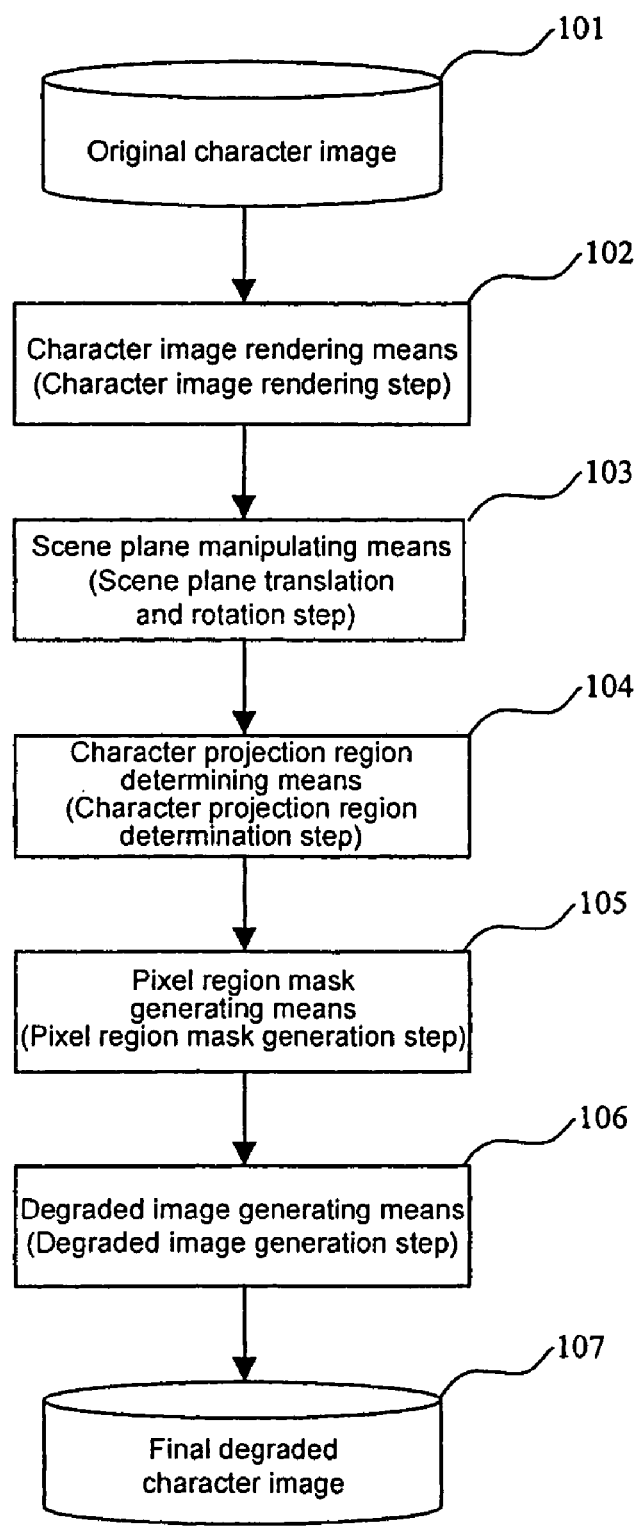
FIG. 1 is a flowchart of the method performed by a degraded image generation apparatus according to an embodiment of the invention.

FIG. 1 shows a flowchart of the method performed by a degraded image generation apparatus, which is a preferred embodiment of the invention.

The input of the degraded image generation apparatus of the invention is an original character image 101, usually in binary format. First, a character image rendering means 102 draws the original image on a 2D scene plane. Then a scene plane manipulating means 103 translates and rotates the scene plane. After that, a projection region determining means 104 determines a projection region of the character image on an image plane. Next, a pixel region mask generating means 105 generates a pixel region mask. Finally, a degraded image generating means 106 generates a degraded image by super-sampling and outputs the obtained degraded image as an output of the degraded image generation apparatus of this invention.

The degraded image generation apparatus of the invention can be consisted of appropriately programmed processors and relevant memories. According to the invention, one skilled in the art can construct such a degraded image generation apparatus easily. Therefore, no further explanation on each part of the degraded image generation apparatus of the invention will be given in consideration of clarity.

Two key issues addressed in the degraded image generation method and apparatus of the invention are how to determine the region of the generated image under different parameter settings, and how to determine the pixel value for every pixel in the generated character image.

For the first issue, it is necessary to map the 4 corner points of the original character image onto image plane by perspective transformation. The quadrangle region formed by the 4 projected corner points is the region for the generated degraded image. The second issue exists because there is no one-to-one correspondence between pixel in the degraded character image and pixel in the original image, while every pixel in the degraded images actually corresponds to a quadrangle region in the scene plane. Thus the grayscale value for a pixel in the image plane should be determined by the average grayscale value of the quadrangle region in the scene plane.

Figure 2:
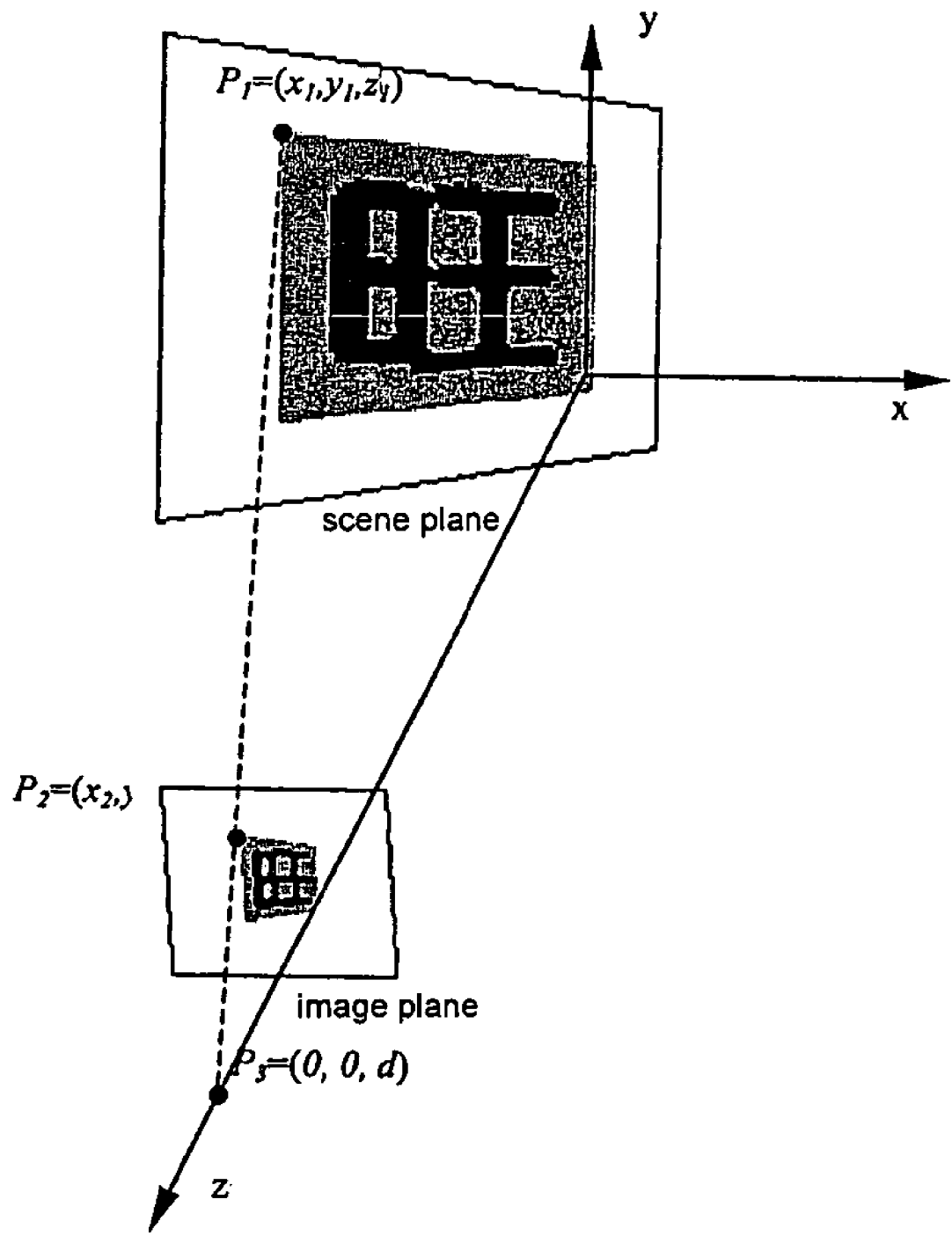
FIG. 2 is an illustration view of the degraded image generation process according to an embodiment of the invention.
Figure 3:
FIG. 3 shows an example of an original character image.
Figure 4:
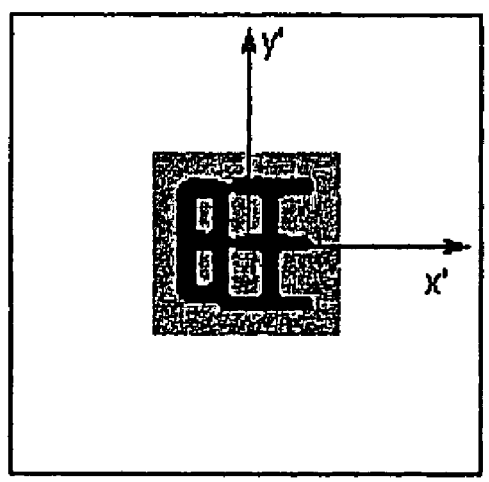
FIG. 4 shows an example of the result of character image rendering.

A preferred embodiment of the degraded image generation method and apparatus of the invention will be explained below in more detail, with reference to FIG. 2 to FIG. 9. First, a character image rendering means 102 draws an original character image on a scene plane. FIG. 2 shows an example of drawing the original image on a 2D scene plane. The scene plane is a 2D plane. In the example shown in FIG. 2, the scene plane is overlapped with the x-y plane. The origin of the scene plane, (0,0), coincides with the global coordinate origin (0,0, 0). For simplicity, assuming that the view point, $P_3$, is on z axis with pixel coordinate $P_3=(0,0,d)$. The character image rendering means 102 draws the original image on the scene plane. Since real video characters aren't always binary, the grayscale value of stroke pixel and background pixel can be adjusted to meet practical need. Therefore, the drawn image becomes a grayscale image. A typical original character image is shown in FIG. 3. The size of the character image is 640 by 640 pixel. An example of the rendering result is shown in FIG. 4. The grayscale value of background points in the image is adjusted to 196. The grayscale value of stroke points in the image is set to 0.

Figure 5:
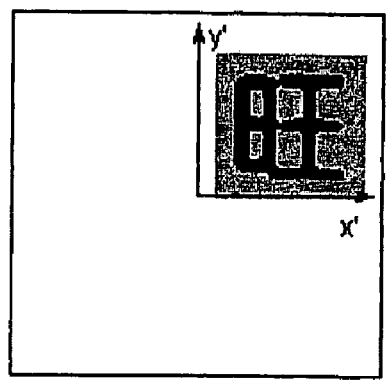
FIG. 5 shows an example of the result of scene plane translation.
Figure 6:
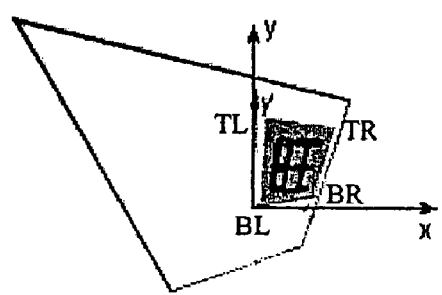
FIG. 6 shows an example of the result of scene plane rotation.

Then, a scene plane manipulating means 103 transforms the scene plane. The transformation is composed of 2 steps: translation and rotation. The scene plane is first translated in x-y plane. Then the plane is rotated around the coordinate origin. The degree of translation is determined by the translation offset in x direction, $t_x$, and the translation offset in y direction, $t_y$. The degree of rotation is determined by the rotation angle, $\Psi$, around z axis, $\theta$, around y axis, and $\phi$, around x axis. FIG. 5 shows an example of translation, wherein $t_x=400$, $t_y=300$. FIG. 6 shows the result of rotation of FIG. 5 with rotation angle $\Psi=10$ degree, $\theta=20$ degree, $\phi=30$ degree. Assuming that $P_0$ is a point in the initial scene plane, its scene coordinate is $(x_0,y_0)$, and its pixel coordinate in the 3D space is $(x_0,y_0,0)$. $P_1$ is the same point after scene plane transformation. The pixel coordinate of $P_1$ in the 3D space is $(x_1,y_1,z_1)$. Assuming that the translation vector for the scene plane is $t=[t_x,t_y,0]^T$, the rotation matrix for transforming x-y plane to scene plane is $R_x$, $R_y$ and $R_z$ for axes x, y and z respectively. The relationship of $P_0$ and $P_1$ is:

$$P_1 = R_z R_y R_x P_0 + t \quad (1)$$

Wherein $P_1 = [x_1, y_1, z_1]^T$, $P_0 = [x_0, y_0, 0]^T$, $R_x = \begin{bmatrix} 1 & 0 & 0 \\ 0 & \cos\phi & -\sin\phi \\ 0 & \sin\phi & \cos\phi \end{bmatrix}$ $R_y = \begin{bmatrix} \cos\theta & 0 & \sin\theta \\ 0 & 1 & 0 \\ -\sin\theta & 0 & \cos\theta \end{bmatrix}$, $R_z = \begin{bmatrix} \cos\psi & -\sin\psi & 0 \\ \sin\psi & \cos\psi & 0 \\ 0 & 0 & 1 \end{bmatrix}$, $\phi$, $\theta$, and $\Psi$ are rotation angles around x, y, and z axes respectively.

After the scene plane manipulating means 103 transforms the scene plane, a projection region determining means 104, based on a fixed view point (for example, the center of a camera) and a fixed image plane (i.e., the plane where final degraded image is formed), determines the projection region of transformed character image onto the image plane.

The image plane is a 2D plane that is perpendicular to z axis. Distance of $P_3$ to the image plane is the focal length $f$. All points in the image plane have the same value for z coordinate. Once the view point is determined, through perspective transformation, every point in the scene plane has a projection on the image plane. The projections (of all character image points in the scene plane) onto the image plane constitute a projection character image, which is regarded as the output of the method and apparatus of the invention.

In particular, assuming that the 4 points TL, TR, BL, BR are the top-left, top-right, bottom-left, bottom-right point of the rendered character image after scene plane transformation. The pixel coordinate for the 4 projected points, TL', TR', BL', BR' in the image plane can be derived by Equations (4) and (5) below. These 4 points will form an irregular quadrangle, which is regarded as the character image projection region.

Process of projecting a point in the scene plane onto the image plane will be explained in detail below.

Assuming that $P_2$ is the projection point of $P_1$ onto the image plane. $P_1$, $P_2$ and $P_3$ are co-linear. Using triangle similarity, we can get following equations:

$$(x_3-x_2)/(x_3-x_1)=(z_3-z_2)/(z_3-z_1) \quad (2)$$

$$(y_3-y_2)/(y_3-y_1)=(z_3-z_2)/(z_3-z_1) \quad (3)$$

There are 5 equations in (1)~(3). Known variables are, $x_3=0$, $y_3=0$, $z_3=d$, $z_2=d-f$. Unknown variables are $x_0,y_0,x_1,y_1,z_1,x_2$, $y_2$. Given the scene coordinates $x_0,y_0$, we can derive the corresponding coordinates $x_2,y_2$ in the image plane, by solving (1)~(3):

$$x_2 = \frac{f\begin{pmatrix} t_x\cos\theta\cos\psi - t_y\cos\phi\sin\psi + t_y\sin\phi\sin\theta\cos\psi - \\ y_0\cos\phi\sin\psi + x_0\cos\theta\cos\psi + y_0\sin\phi\sin\theta\cos\psi \end{pmatrix}}{(d + t_x\sin\theta - t_y\sin\phi\cos\theta + x_0\sin\theta - y_0\sin\phi\cos\theta)} \quad (4)$$

$$y_2 = \frac{f\begin{pmatrix} t_x\cos\theta\sin\psi + t_y\cos\phi\cos\psi + t_y\sin\phi\sin\theta\sin\psi + \\ y_0\cos\phi\cos\psi + x_0\sin\theta\sin\psi + y_0\sin\phi\sin\theta\sin\psi \end{pmatrix}}{(d + t_x\sin\theta - t_y\sin\phi\cos\theta + x_0\sin\theta - y_0\sin\phi\cos\theta)} \quad (5)$$

Given $x_2, y_2$, then $x_0$ and $y_0$ are obtained as follows:

$$x_0 = -t_x - \frac{\begin{pmatrix} x_2 d\cos\psi\cos\phi + x_2 d\sin\psi\sin\phi\sin\theta + \\ y_2 d\sin\psi\cos\phi - y_2 d\cos\psi\sin\phi\sin\theta \end{pmatrix}}{\begin{pmatrix} -f\cos\psi\cos\psi\cos\theta\cos\phi - f\sin\psi\sin\psi\cos\theta\cos\phi + \\ x_2\sin\psi\cos\theta\cos\theta\sin\phi + x_2\cos\psi\sin\phi\cos\phi + \\ x_2\sin\psi\sin\theta\sin\theta\sin\phi - y_2\cos\psi\cos\phi\cos\theta\sin\phi + \\ y_2\sin\psi\sin\theta\cos\phi - y_2\cos\psi\sin\theta\sin\theta\sin\phi \end{pmatrix}} \quad (6)$$

$$y_0 = -t_y + \frac{(d\cos\theta(x_2\sin\psi - y_2\cos\psi))}{\begin{pmatrix} -f\cos\psi\cos\psi\cos\theta\cos\phi - f\sin\psi\sin\psi\cos\theta\cos\phi + \\ x_2\sin\psi\cos\theta\cos\theta\sin\phi + x_2\cos\psi\sin\phi\cos\phi + \\ x_2\sin\psi\sin\theta\sin\theta\sin\phi - y_2\cos\psi\cos\phi\cos\theta\sin\phi + \\ y_2\sin\psi\sin\theta\cos\phi - y_2\cos\psi\sin\theta\sin\theta\sin\phi \end{pmatrix}} \quad (7)$$

Figure 7:
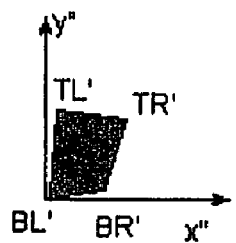
FIG. 7 shows an example of the projection region of the character image in the image plane.

Hence, the projection region determining means 104 determines the projection region of transformed character image onto the image plane. FIG. 7 shows an example of the character image projection region in the image plane.

Figure 8:
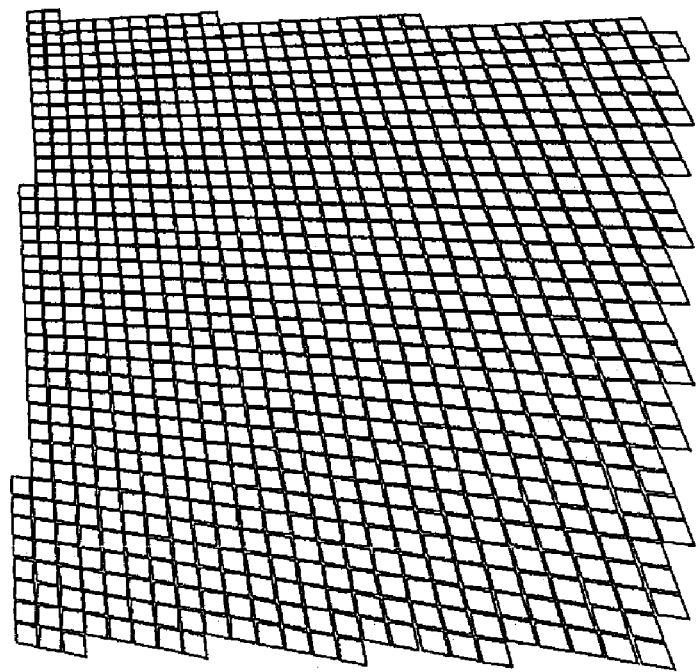
FIG. 8 shows an example of the pixel region mask in the scene plane.

After the projection region in the image plane is determined, a pixel region mask generating means 105 generates a pixel region mask. Usually, there is no pixel-to-pixel correspondence between pixel in the scene plane and pixel in the image plane. One pixel in the image plane corresponds to a quadrangle region in the scene plane. The grayscale value of the pixel in the image plane is determined by the average grayscale value of the quadrangle region in the scene plane. In the invention, assuming that, within the projection region in the image plane, every pixel is represented by a unit square. Assuming that the 4 corner points of the square are $P_{TL}$, $P_{TR}$, $P_{BL}$, $P_{BR}$, these 4 points are mapped into $P_{TL}'$, $P_{TR}'$, $P_{BL}'$, $P_{BR}'$ in the scene plane using Equations (6) and (7). Thus, the unit square in the image plane is then mapped into a quadrangle region constructed by $P_{TL}'$, $P_{TR}'$, $P_{BL}'$, $P_{BR}'$ in the scene plane. This region is called pixel region mask. FIG. 8 shows all the pixel region masks in the scene plane from FIG. 7.

Finally, a degraded image generating means 106 calculates the pixel value for a point in the character image projection region according to the average grayscale value in its corresponding pixel region mask.

Figure 9:
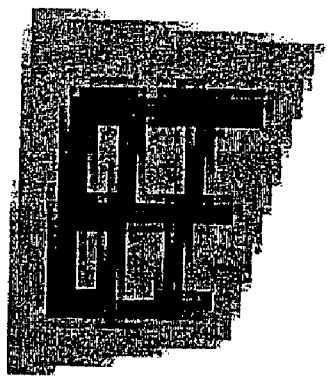
FIG. 9 is an example of the final generated degraded character image.

For each pixel in the character image projection region, the pixel region mask generating means 105 determines its corresponding region in the scene plane. The degraded image generating means 106 outputs the final degraded character image 107 by assigning the average grayscale value in the corresponding mask region as the grayscale value of the pixel in the image plane. FIG. 9 shows the results of final generated degraded character image (amplified by 4 times).

Hereby, the process of generating degraded character images is accomplished by the degraded image generation apparatus of the invention. It is obvious that the degraded image generation apparatus and method of the invention can generate degraded character images according to various conditions of degradation. Various conditions of degradation can be determined by, for example, degree of translation of the scene plane, degree of rotation around 3 axes, and positions of the scene plane and the image plane, and so on, thus degraded character images under various conditions of degradation can be obtained.

Furthermore, the invention is described with respect to a preferred embodiment above. However, it is understandable that the invention is not limited to specific details mentioned above. Forms and details of the degraded image generation method and apparatus of the invention can be varied within the scope restricted by the claims.

What is claimed is:

1. A method for generating a degraded character image at various levels of degradation, comprising:
   rendering a character image on a scene plane;
   translating and rotating the scene plane according to a first set of various parameters;
   determining a projection region of the character image on an image plane according to a second set of various parameters;
   generating a pixel region mask; and
   generating a final degraded image by super-sampling.

2. The method of claim 1, wherein rendering the character image comprises:
   rendering the character image on a 2-dimensional plane; and
   changing the grayscale value of the character strokes and the background.

3. The method of claim 1, wherein translating and rotating the scene plane comprises:
   translating the scene plane in x and y axes directions; and
   rotating the scene plane about x, y and z axes.

4. The method of claim 1, wherein determining the projection region of the character image on the image plane comprises:
   determining four corner points of the character image in the scene plane;
   calculating pixel coordinates at which the four corner points are projected onto the image plane;
   constructing a quadrangle region in the image plane with the projected four corner points, the region inside the quadrangle is taken as the projection region of the character image.

5. The method of claim 1, wherein generating the pixel region mask comprises:
   representing each point in the character image projection region in the image plane as a regular polygon;
   projecting each vertex of the regular polygon onto the scene plane;
   taking the polygon region formed by projected vertexes in the scene plane as the pixel region mask in the scene plane of pixels in the image plane.

6. The method of claim 1, wherein generating the degraded image comprises:
   for each point in the character image projection region in the image plane, selecting all pixels in the scene plane within a region defined by the pixel region mask; and
   calculating an average grayscale value of the selected pixels, as a pixel value in the image plane.

7. An apparatus for generating a degraded character image at various levels of degradation, comprising:
   character image rendering means for rendering a character image on a scene plane;
   scene plane manipulating means for translating and rotating the scene plane according to a first set of various parameters;
   projection region determining means for determining a projection region of the character image on an image plane according to a second set of various parameters;
   pixel region mask generating means for generating a pixel region mask; and
   degraded image generating means for generating a final degraded image by super-sampling.

8. The apparatus of claim 7, wherein the character image rendering means renders the character image on a 2-dimensional plane, and changes a grayscale value of character strokes and a background.

9. The apparatus of claim 7, wherein the scene plane manipulating means translates the scene plane in x and y axes directions, and rotates the scene plane about x, y and z axes.

10. The apparatus of claim 7, wherein the projection region determining means determines four corner points of the character image in the scene plane; calculates pixel coordinates at which the four corner points are projected onto the image plane; and constructs a quadrangle region in the image plane with the projected four corner points, the region inside the quadrangle is taken as the projection region of the character image.

11. The apparatus of claim 7, wherein the pixel region mask generating means represents each point in the character image projection region in the image plane as a regular polygon; projects each vertex of the regular polygon onto the scene plane; and takes the polygon region formed by projected vertexes in the scene plane as the pixel region mask in the scene plane of pixels in the image plane.

12. The apparatus of claim 7, wherein the degraded image generating means selects all pixels in the scene plane within a region defined by the pixel region mask, for each point in the character image projection region in the image plane, and calculates an average grayscale value of the selected pixels, as a pixel value in the image plane.

* * * * *

UNITED STATES PATENT AND TRADEMARK OFFICE
CERTIFICATE OF CORRECTION

PATENT NO.        : 7,480,409 B2  
APPLICATION NO.   : 11/200202  
DATED             : January 20, 2009  
INVENTOR(S)       : Sun Jun et al.

It is certified that error appears in the above-identified patent and that said Letters Patent is hereby corrected as shown below:

Title Page, item [30] Column 1 (Foreign Application Priority Data), Line 1, change "2004 1 0058171" to --2004100581716--.

Signed and Sealed this

Twenty-fourth Day of March, 2009

JOHN DOLL  
*Acting Director of the United States Patent and Trademark Office*